No. 860,214. PATENTED JULY 16, 1907.
T. C. HOLSCLAW.
SAW FILING MACHINE.
APPLICATION FILED OCT. 12, 1906.
2 SHEETS—SHEET 2.
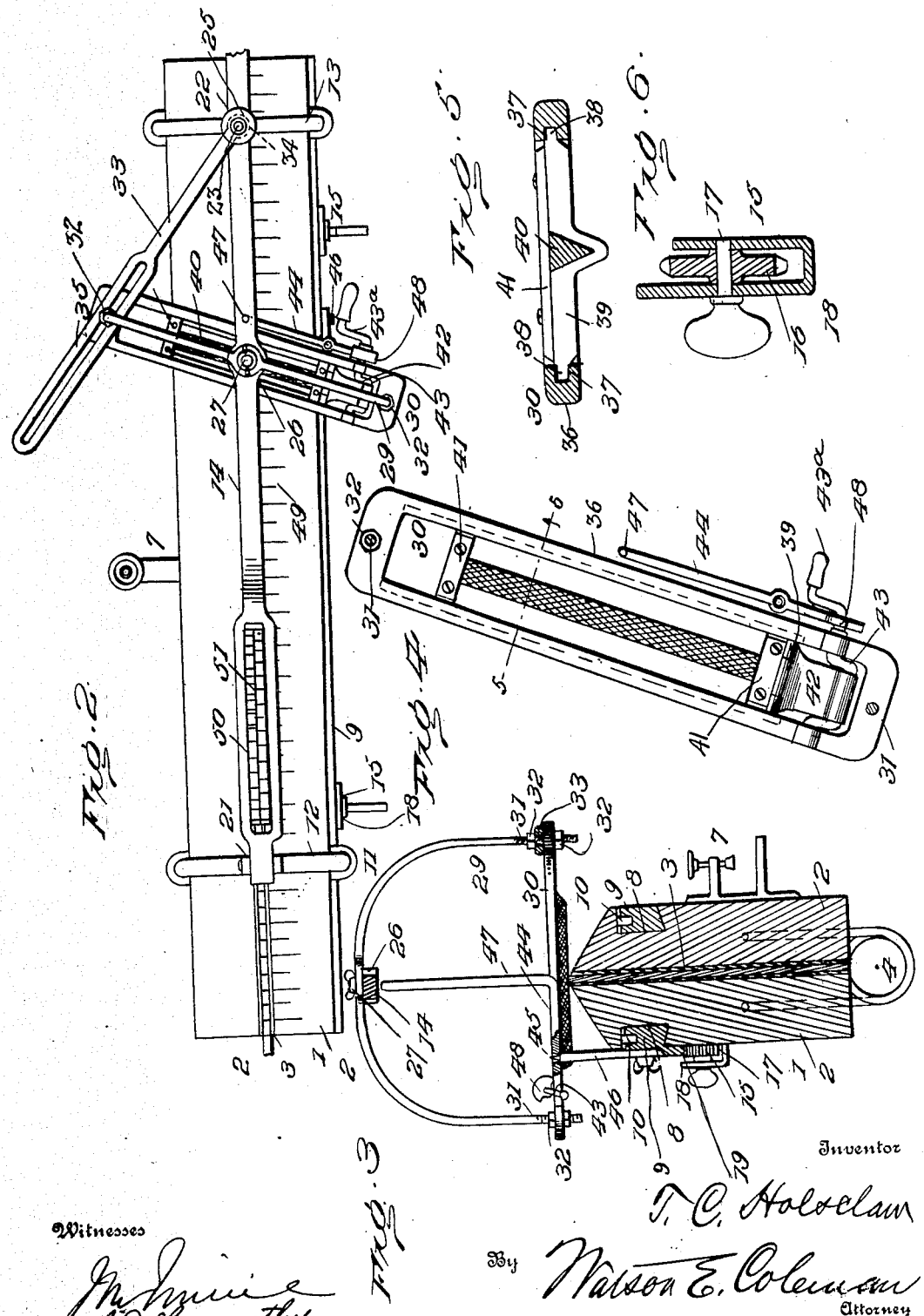
Witnesses
Inventor
T. C. Holsclaw
By Watson E. Coleman
Attorney

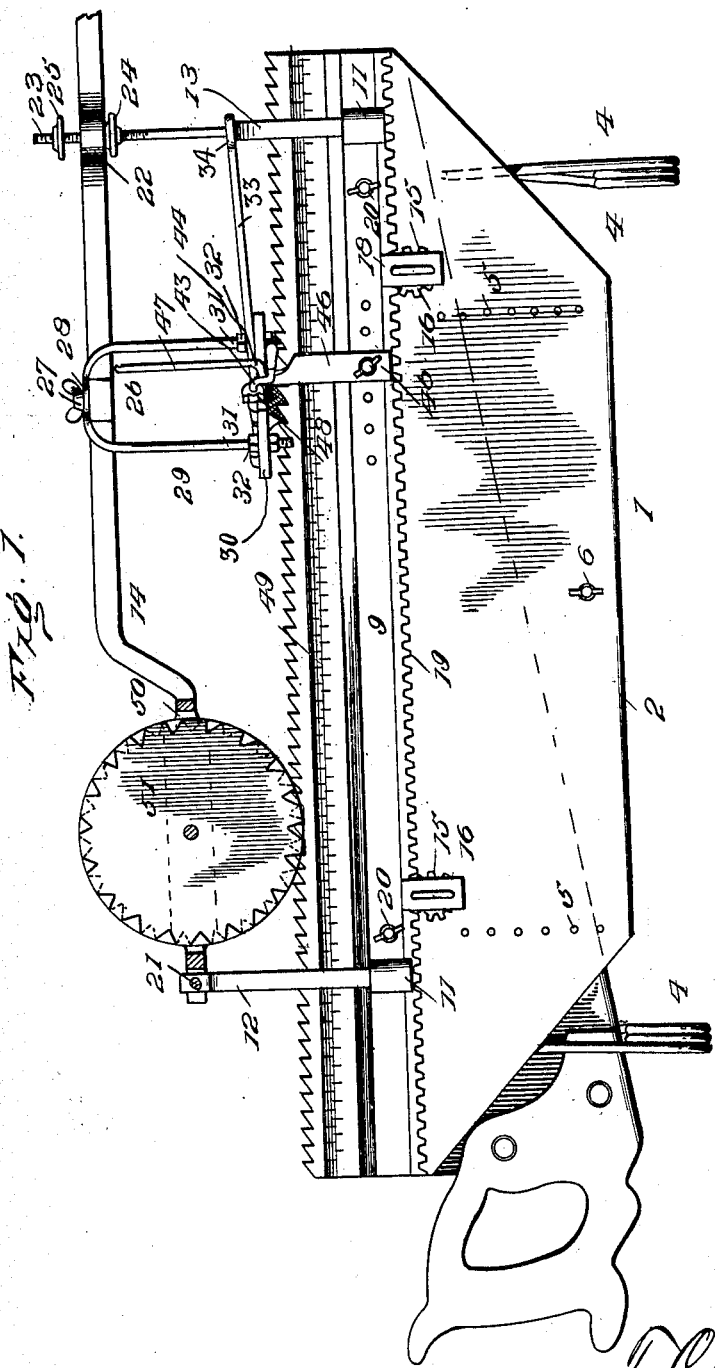

UNITED STATES PATENT OFFICE.

THOMAS CLINGMAN HOLSCLAW, OF ETOWAH, NORTH CAROLINA.

SAW-FILING MACHINE.

No. 860,214.  Specification of Letters Patent.  Patented July 16, 1907.

Application filed October 12, 1906. Serial No. 338,626.

*To all whom it may concern:*

Be it known that I, THOMAS CLINGMAN HOLSCLAW, a citizen of the United States, residing at Etowah, in the county of Henderson and State of North Carolina, have invented certain new and useful Improvements in Saw-Filing Machines, of which the following is a specification, reference being had therein to the accompanying drawing.

This invention relates to improvements in saw filing machines and consists in the novel construction, combination and arrangement of parts hereinafter described and claimed.

The object of the invention is to provide a simple and practical machine of this character by means of which a saw may be rapidly and effectively filed.

Further objects and advantages of the invention, as well as the structural features by means of which they are attained, will be made clear by an examination of the following specification, taken in connection with the accompanying drawings, in which, Figure 1 is a view in elevation of my improved saw filing machine; Fig. 2 is a top plan view of the same; Fig. 3 is a vertical transverse sectional view; Fig. 4 is a detail plan view, on an enlarged scale, of the filing frame and its attached parts; Fig. 5 is a transverse sectional view taken on the plane indicated by the line 5—5 in Fig. 4; and Fig. 6 is a detail view of the rack and pinion by means of which the file is adjusted longitudinally of the saw clamp.

My improved saw filer comprises a clamp 1 including duplicate clamping plates 2, of the desired length and width, the proximate faces of which are covered with a gripping and deadening strip 3, such as rubber or the like. The plates are held in clamping relation through the medium of coil springs 4 arranged beneath the plates near each end, the terminals of the springs being seated in the plates, and the springs so adjusted as to normally hold the plates in close contact. Near each end the plates are provided with series of vertically arranged holes or openings 5 to receive suitable pins adapted in use to project transverse the space between the plates and provide an adjustable rest for supporting the teeth of the saw in proper position above the upper edges of the clamping plates. In Fig. 1, a bolt 6 is shown in the clamping plates to coöperate with the springs to hold the saw more effectively between said plates. The bolt 6 has a loose engagement with the front clamping plate and a threaded engagement with the back clamping plate, so that when it is screwed inwardly the two plates will be clamped upon the saw.

In Figs. 2 and 3, I show a screw clamp 7 upon one of the plates for securing the device upon a work bench or the like, but any other suitable means may be employed for this purpose.

The outer faces of the clamping plates, near their upper edges, are formed with longitudinally-arranged recesses or grooves 8, the lower walls of which are preferably undercut, as shown in Fig. 3. Slide-bars 9 are arranged for longitudinal movement in these grooves, said bars being preferably provided on their upper edges with rollers 10 to bear against the upper walls of the grooves and reduce friction incident to the movement of the bars. Near the opposite ends, each bar is provided with a bearing sleeve 11 in which are fixedly supported front and rear frames 12, 13, each preferably U-shaped with their terminal edges engaging the similarly arranged sleeve of each of the bars. The supporting frames 12, 13 connect the two slide bars and are in turn connected by a lever 14. The latter and the frames 12, 13 thus form a sliding carrier or carriage for the saw filing-device presently explained. The said carrier is adapted to be adjusted longitudinally of the saw between the clamping plates 2 by rack and pinion devices 15. One of these devices is clearly shown in Fig. 6, and it consists of a pinion 16 fixed upon a shaft 17 which is mounted for rotation in a substantially U-shaped bracket 18 and has a finger-piece upon its outer end. The bracket 18 is secured upon the front clamping plate 2 so that the pinion will mesh with rack teeth 19 formed in the lower face of a projecting portion of the slide-bar 9 in said front plate. Two of the devices 15 are preferably employed, one being arranged adjacent to each end of the saw clamp so that at least one of the pinions 16 will mesh with the rack at all times. Set screws 20 may be provided at suitable points in the bars 9 to clamp the carrier in an adjusted position. Said set screws pass through threaded openings in the bars and have their inner ends impinging against the inner or bottom walls of the grooves 8. The lever 14 is arranged directly above the meeting edges of the plates 2 and is made adjustable vertically by pivoting one of its ends at 21 in the forward supporting frame 12 and by forming adjacent to its opposite end an apertured enlargement 22 through which projects a screw-threaded stud 23. The latter is disposed centrally and vertically upon the top of the rear supporting frame 13, and the rear or handle end of the lever 14 is adjusted upon it by nuts 24, 25 arranged for threaded engagement with said stud above and below the lever.

Intermediate the ends of the lever 14 upon its upper face is arranged a circular enlargement 26 formed with an aperture to receive a screw and nut 27 which also passes through an aperture formed in the flat central portion 28 of a semi-circular bar or rod 29. The latter is adapted to suspend above the saw, a filing frame 30 which is of open rectangular form and has at its ends apertures to receive the depending ends 31 of the semi-circular rod or bar. Said ends 31 are screw-threaded and arranged upon them above and below the filing frame 30 are adjusting nuts 32. Coöperating with the set screw 27 in holding the frame at the proper angle relative to the saw is a rod or link 33 arranged between one of the ends 31 of the semi-circular bar 29 and the stud 23 of the rear supporting frame 13. This rod 33 has at one end an apertured portion 34 to receive the lower smooth portion of the stud 23. At its opposite end the rod 33 is formed with an enlarged, longitudinally-slotted portion 35 which engages the upper face of the filing frame 30 and is clamped thereon by the upper nut 32 on the end 31 of the rod 29, said end 31 passing through the slot in the rod 33, as clearly shown in Figs. 2 and 3 of the drawings. In adjusting the filing frame angularly, the last-mentioned nut 32 is loosened, as well as the nut 27, and when these two parts are tightened, the link or rod 33 and the filing frame will be rigidly connected together and the filing frame will be held at the desired angle.

The filing frame 30 has formed in its longitudinal or side-bars 36 guide-ways 37 which extend practically the entire length of the opening in the frame 30 and are adapted to slidably receive the lugs 38 formed on the ends of transverse brackets 39 in which latter is mounted one or more files 40. But one file is shown in the drawings, and it is of the usual triangular shape. The brackets 39 are shaped to snugly receive the ends of the file, as seen in Fig. 5, and clamping plates 41 are provided on the brackets for securely holding the file therein. By reason of this construction, the file is mounted for longitudinal movement in the frame and this movement is imparted to it by providing its forward bracket 39 with an extension 42 to which is secured a crank 43 having bearings in the side-bars 36 of the frame 30 and provided beyond one of said side-bars with a crank handle 43ª, in the operation of which the file may be rapidly reciprocated longitudinally of the frame, as will be obvious.

Experience has demonstrated that saws cut better when sharpened by filing in but one direction, and it is therefore desirable that means be provided for causing effective cutting of the file of the present invention when moving in but one direction only. This result I attain by providing a lever 44 which is mounted upon a pivot 45 formed upon a bracket 46 which is secured to the front slide bar 9, as clearly shown in Fig. 3. Said lever 44 has at one end an upwardly bent portion 47 which directly underlies the lever 14 but is normally just out of contact therewith. The outer or forward end of the lever 44 extends beneath the crank 43 in position to be contacted with by a semi-circular block or cam 48 adjustably secured upon said crank. In operation, the movement of the crank for one-half of its revolution causes the cam 48 to bear upon the outer end of the lever 44 with the effect to elevate the end 47, and thereby elevate the lever 12. This movement of the lever 12 will raise the file out of cutting contact with the saw during its movement in one direction, so that the filing effect is gained by movement of the file in one direction only.

In order to provide a positive gaging means for the cutting portion of the file or files of the filing frame, I arrange a plurality of series of gaging lines 49 on the outer faces of one or both clamp plates 2, each of said series of lines being respectively arranged to indicate the proper distance apart of the teeth of different gage saws. In operation, the file or files of the filing frame are adjusted with respect to the desired series of lines, thereby insuring an exact relative spacing of the teeth when filed, and producing a perfectly spaced saw without regard to its condition when initially placed in the clamp.

In order to permit of the use of the machine as a saw set, I journal in a slotted portion 50 of the lever 14 a saw setting wheel 51. The construction and operation of this wheel is clearly set forth in a co-pending application filed by me December 9th, 1905, and bearing Serial Number 291,086. This wheel is preferably removed when the machine is used for filing the saw.

In operation, the saw is securely clamped between the plates 2 so that its teeth project slightly above the upper edges of said plates and are in parallel relation therewith. The filing frame 30 is then adjusted at the proper angle by the rod 33 and the set screw 27, and at the proper elevation by adjusting the nut 25 upon the screw stud 23. The nut 24, limiting the upward movement of the lever, is then adjusted a sufficient distance above said lever. One of the knobs or finger-pieces of the rack and pinion devices 15 is then turned to move the file longitudinally of the saw and permit it to aline with one of the gage lines 49. The crank handle 43ª is then turned to reciprocate the file, causing the latter to cut the tooth to the desired shape. After one tooth has been cut the handle 43ª is turned to a position in which the cam 48 depresses the lever 44 to cause the end 47 of the latter to elevate the filing frame 30, and one of the devices 15 is then operated to aline the file with the next succeeding gage line, and the file is again operated. It will thus be seen that the machine will file the teeth uniformly in a quick and efficient manner, and that an unskilled person may readily operate it.

Having thus described my said invention, what I claim as new and desire to secure by Letters Patent of the United States, is

1. A saw filing machine comprising a clamp, a carriage slidable on the clamp, a support upon said carriage, an inverted, U-shaped, suspending frame pivoted upon the support and having one of its ends screw threaded, a filing frame upon the depending ends of said U-shaped suspending frame, a link pivoted at one of its ends upon the carriage and having its other end slotted to receive the threaded end of said suspending frame, and a nut upon the threaded end of said suspending frame for clamping the slotted portion of said rod upon said filing frame.

2. A saw filing machine comprising a clamp, a carriage slidable on the clamp, a support upon said carriage an inverted, U-shaped, suspending frame pivoted upon the support and having its depending ends screw threaded, a filing frame apertured to receive the threaded ends of said suspending frame, nuts upon the threaded ends of said suspending frame above and below said filing frame, and a file in said filing frame, substantially as described.

3. A saw filing machine comprising a saw clamp, a carriage slidable on the clamp, a filing frame upon the carriage, said frame having side bars formed in their opposing edges with the longitudinally extending grooves 37, cross bars arranged between said side bars and having their ends reduced to form the tongues 38 which enter and slide in said grooves 37, said cross bars being formed with depressions or seats, a file having its ends engaged with said depressions or seats in the cross bars, the clamping plates 41 secured upon said cross bars for retaining the file in said depressions or seats, and means attached to one of said cross bars for reciprocating the latter and the file between them, substantially as described.

4. A saw filing machine comprising a saw clamp, a carriage slidable on the clamp uprights upon said carriage, a file carrying frame, a support for said frame mounted upon said uprights and arranged longitudinally above and movable vertically toward and from the saw in the clamp, a crank shaft, a cam upon the latter, and a lever pivoted intermediate its ends upon the carriage and having one of its ends actuated by said cam and its other end adapted for engagement with said support, for the purpose specified.

5. A saw filing machine comprising a saw clamp, a carriage slidable on the clamp supports upon the carriage, a member upon said supports and movable toward and from the saw in the clamp, a suspending frame upon the movable member, a filing frame upon said suspending frame, a file in said filing frame, a crank shaft mounted on said filing frame for operating said file, a cam upon said crank shaft, and a lever pivoted intermediate its ends upon the carriage and having one of its ends actuated by said cam and its other end adapted for engagement with the movable member, substantially as shown and for the purpose set forth.

6. A saw filing machine comprising a saw clamp a carriage slidable on the clamp, a bracket upon said carriage having a pivot stud at its upper end, an upright support upon the carriage, a longitudinally extending lever pivoted to said support and adapted to swing vertically toward and from the saw in the clamp, a suspending frame upon said lever, a filing frame upon said suspending frame, a file in said filing frame, a crank shaft mounted on said filing frame for reciprocating said file, a lever loosely pivoted intermediate its ends upon the pivot stud of said bracket and having one of its ends bent to engage said longitudinally extending lever, and a cam upon said crank shaft for engagement with the other end of said lever, substantially as shown and for the purpose set forth.

7. A saw filing machine comprising a saw clamp, longitudinal bars slidable in grooves in the clamp, U-shaped frames upon said bars, a lever pivoted upon one of said frames, a screw stud upon the other of said frames and projecting through an aperture in said lever, nuts upon said stud above and below said lever, and a saw filing device carried by said lever, substantially as described.

In testimony whereof I hereunto affix my signature in presence of two witnesses.

THOMAS CLINGMAN HOLSCLAW.

Witnesses:
A. F. JORDAN,
E. E. LEWIS.